Aug. 17, 1965  D. F. SWEET  3,200,572
COTTON GLEANER

Filed Jan. 8, 1965  5 Sheets-Sheet 1

INVENTOR.
Dale F. Sweet
BY Scott L. Norvell
Atty.

Aug. 17, 1965  D. F. SWEET  3,200,572
COTTON GLEANER

Filed Jan. 8, 1965  5 Sheets-Sheet 3

INVENTOR.
DALE F. SWEET
BY
Wm. H. Dean

Aug. 17, 1965   D. F. SWEET   3,200,572
COTTON GLEANER
Filed Jan. 8, 1965   5 Sheets-Sheet 4

INVENTOR.
DALE F. SWEET though the belt were ground driven; and means for power-

United States Patent Office 3,200,572
Patented Aug. 17, 1965

3,200,572
COTTON GLEANER
Dale F. Sweet, 298 E. Glaveston, Chandler, Ariz.
Filed Jan. 8, 1965, Ser. No. 424,412
13 Claims. (Cl. 56—28)

This invention concerns a cotton gleaner.

This application is a continuation in part of my previous applications for Cotton Gleaner, Serial No. 231,662, filed Oct. 19, 1962, and Serial No. 254,018, filed Jan. 25, 1963, both now abandoned.

One of the objects of the invention is to provide a machine to glean or recover cotton which has been knocked down to the ground by the ordinary picking machines which, as is well known to the art, are not entirely efficient.

Another object is to provide means for securing and lifting the various tufts of cotton from the ground in an efficient manner and conveying them to a cotton cage positioned on a tractive vehicle.

Still another object is to provide a cotton gleaner device which uses a plurality of steel bands having sharp teeth on their outer faces and supported and moved as belts over a pair of pulley-like wheels in a manner so that the teeth will extend into any loose cotton encountered on the ground and carry it upward on the upper side or lay of the belt to a brush which will remove it from the teeth and direct it into an inlet pipe of a blower which will carry it and exhaust it into a cotton receiving cage.

Still another object is to provide a metal belt having metal teeth to take hold of and move loose cotton found lying in the field; said belt being moved at a predetermined level just above the ground at its lower bend.

Another object of the invention is to provide a thin sheet metal belt for use in picking cotton from the ground, said belt being formed of a thin single strip of sheet metal from which teeth are punched out and projected beyond the plane of the belt, thereby providing very economical and readily replaceable cotton pick up structure.

Still another object is to provide mechanism for driving a gang of belts operating in laterally spaced positions, said gang covering an area approximately the width of a cotton row.

Still another object is to provide means for driving said belts attached to and driven from mechanism on the tractive vehicle.

Still another object is to provide a means of regulating the height of the gleaning attachment relative to the ground from which the cotton is to be gleaned and for supporting the weight of the machine independently of the runners which support the pick-up end of the belt and the pulley over which it runs at the pick-up end.

Still another object is to provide a device including a pulley for holding and driving the pick-up metal belt and for providing takeup means to maintain a tension on the belt and also to provide a pulley which will hold the belt and will prevent foreign matter from getting between the belt and the pulley.

Another object of the invention is to provide a cotton harvester having a novel sheet metal belt having punched out cotton boll pick-up teeth and novel guide means for guiding the belt relative to sheaves over which the belt runs.

Another object of the invention is to provide a novel cotton harvester having novel sheet metal belts operable over sheaves adjacent to the ground; and fender means spaced from said sheave and said belt and disposed to retain cotton bolls on said belt after it passes in close proximity to the ground and is in movement toward a cotton harvester collector mechanism.

Another object of the invention is to provide a cotton harvester having novel sheet metal belts provided with punched out teeth; said harvester movable in one direction; the teeth of said belts rotatable in the opposite direction at a speed slightly greater than the forward movement of the harvester.

Another object of the invention is to provide a cotton harvester having a tooth belt structure operable on sheaves and movable along the ground; said belt movable rotatably about a sheave in a direction similar to that as though the belt were ground driven; and means for powering said belt to drive it slightly faster than ground driving speed of operation.

Another object of the invention is to provide a novel cotton harvester belt pick-up and sheave supporting means wherein a shield is provided around the axes of the sheaves which support the belts adjacent the ground to prevent cotton from winding around the axes of the sheaves and jamming operation thereof.

Another object of the invention is to provide a novel cotton harvester in which flexible metal belts are provided with cotton impaling teeth thereon and said belts are driven by an annular row of rotary magnets so that the metal belts may be guided and in a slack condition adjacent to guides for holding the belts generally adjacent to the ground such that the metal belts are not driven in a taut condition and therefore are not subject to yield stresses or fatigue failures whereby metal pick-up belts may be operated for great periods of time without breakage.

Another object of the invention is to provide a novel cotton harvester employing cotton pick-up belts operable adjacent to the ground and having cotton impaling teeth thereon; said belts driven in a rotary manner by a plurality of magnets arranged in a drum-like annular row, thus, permitting the belts to operate in slack condition and closely conform to the surface of the ground due to the slack arrangements of the belts.

Other objects will appear hereinafter.

I attain the foregoing objects by means of the devices, parts and combinations of parts shown in the accompanying drawings, in which:

FIG. 16 is a vertical sectional view of a modified form of the invention showing the slatched metal belts motivated by a rotary magnetic drive mechanism and illustrating portions of a carrying vehicle fragmentarily;

Similar numerals refer to similar parts in the several views.

Figure 1:
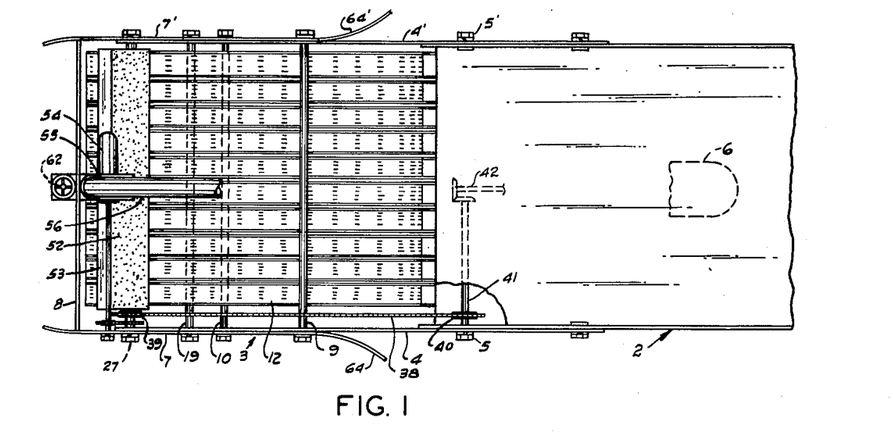
FIG. 1 is a plan view of the device attached to the front portion of a tractive implement or vehicle.

As shown in the drawings, 2 indicates the front end of a tractive implement or vehicle structure. The gleaning device as here concerned is designated generally by numeral 3 and has side frame pieces 4 and 4' which extend rearwardly from and are attached at 5 and 5' to the front end of the vehicle 2. It is to be understood that the vehicle is supported on running or riding wheels such as 6, FIG. 2.

The body frame of the device here disclosed, consists of side plates 7 and 7' which are held together by struts or cross pieces designated at 8, 9 and 10.

Within this frame there is a gang of belts generally indicated by numeral 12 which are each made the same and supported in a similar manner. The belts are supported at the top on pulleys 14 and at the bottom on pulleys 15. The two lays (upper and lower) of the belt extend from pulleys 14 rearwardly and downwardly to pulleys 15.

Figures 3, 4, 5, 6, 7, 8:
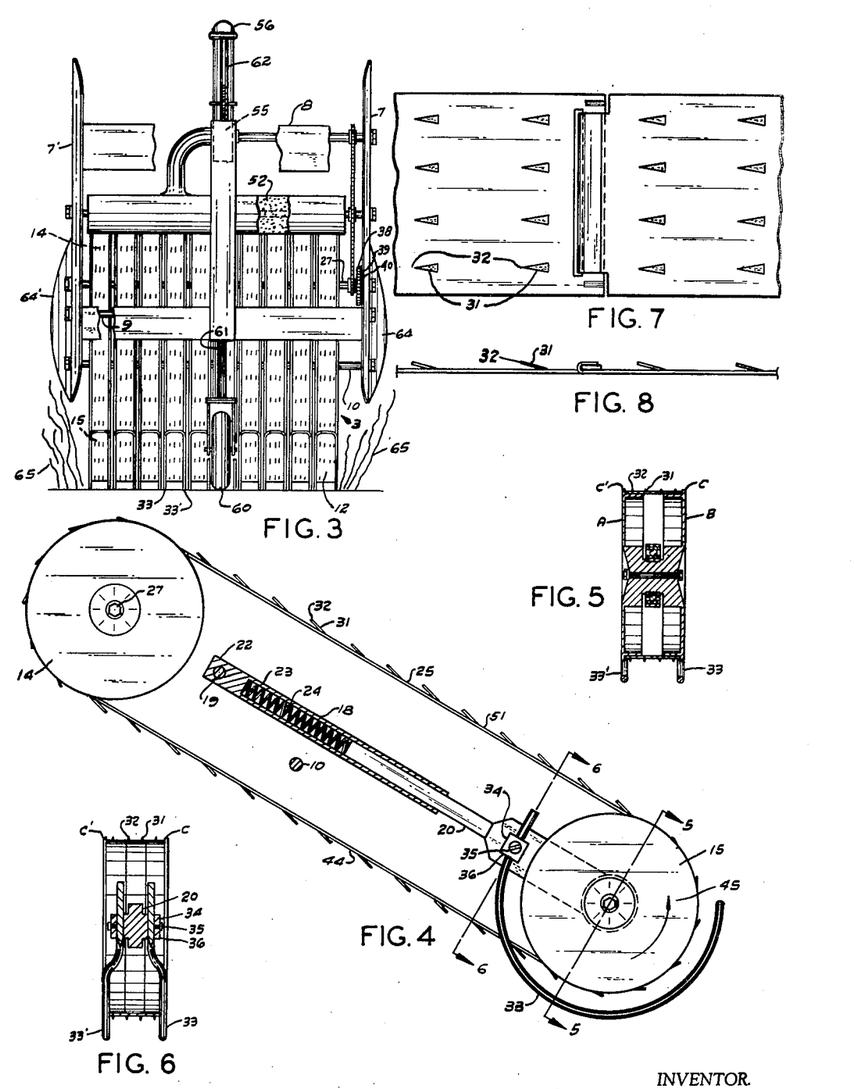
FIG. 3 is a front end view of the pick-up device as applied to a vehicle, as illustrated in FIG. 1.
FIG. 4 is a side view of one of the gleaning elements as supported on pulleys within the mechanism shown in FIG. 1, and drawn on an enlarged scale.
FIG. 5 is a sectional elevational view of one of the lower pulleys supporting the gleaning element; said section being taken substantially on line 5—5 of FIG. 4.
FIG. 6 is a sectional view of the lower supporting pulley for the gleaning elements showing the means of attachment of the runners; said section being taken substantially on line 6—6 of FIG. 4.
FIG. 7 is a plan view of the upper face of a gleaning belt of the type herein concerned showing the means for joining the ends of said belt.
FIG. 8 is a side view or edge view of the belt as shown in FIG. 7.

There is a stretcher or tensioning and support element 18, which extends between each face of the pulleys, and which consists of a lower bar part 20, as shown in FIGS. 4 and 6, and an upper bar part 22, as shown best in FIG. 4. Each upper bar part 22 is pivotally supported on a transverse shaft 19 which is supported by plates 7 and 7'. A hollow bore 23 contains a spring 24. This spring urges the upper end of 20 outward and downward to maintain a resilient tension on the gleaner belt 25. Note that, as shown in FIGS. 1 and 3, there are ten of these gleaner belts. Each belt runs over an upper pulley, such as 14, and a lower pulley, such as 15. The belt pick-up unit pivots on the shaft 27 on which the upper pulleys 14 run. These upper pulleys are keyed to the shaft and turn with it. The lower pulleys are free and are not keyed to their support but are held by a ball bearing support as shown at 30, FIG. 5. Each of the pulleys is made of two parts, A and B, and each of these pulley parts is flanged as at C and C' to keep the belt in place. Each belt is provided with a plurality of outwardly extending teeth 31 made by punching through the belt and producing a tab with a sharp point as at 32 directed toward the travel of the belt. These teeth are disposed so that they will stab into any tuft or ball of cotton that may be lying on or just above the ground over which the belt may be moved.

The thin sheet metal belt structure of the invention, as shown in FIGS. 4, 7, 8, 9, and 11 through 15, may be made of spring steel or other suitable high tensile material, and this belt may range in thickness from .015 to .030 of an inch, it being understood that slight variations of these dimensions may be found desirable. However, flexibility of the belt and economy in the production thereof indicates that a very thin sheet metal belt is highly desirable from both the standpoint of functional characteristics and economy of material.

As shown in FIGS. 4, 7, 8, 9, and 11 through 15, the teeth 31 are punched out of the belt structure and are provided with pointed ends 32 which are pointed in the direction of belt movement to stab or impale cotton bolls, as hereinbefore described.

In accordance with the present invention, these punched out teeth are substantially triangular, having their base portions 66 integral with the belt structure 67. The teeth 31 are punched out and set at an acute angle to the plane of the belt strip 67, as indicated in FIGS. 13 to 15 of the drawings.

Figures 9, 10, 11, 13:
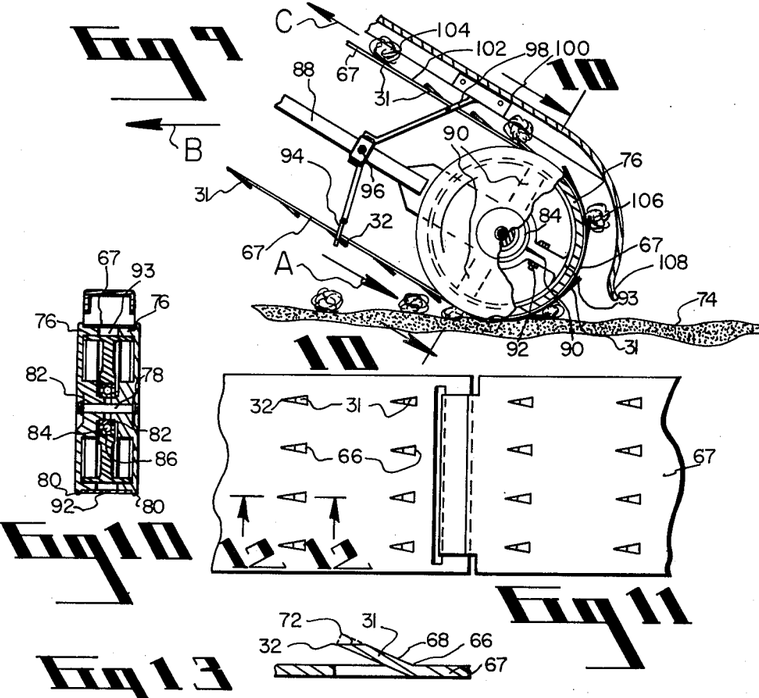
FIG. 9 is a view similar to FIG. 4 showing, fragmentarily, the belt and sheave structure, according to a modification of the invention and further illustrating belt guide and fender means and also means for preventing cotton from winding around the axes of the sheaves which support the belts in adjacent relationship to the ground during cotton pick-up operations; said FIG. 9 showing portions broken away and in section to amplify the illustration.
FIG. 10 is a sectional view taken from the line 10—10 of FIG. 9.
FIG. 11 is a view similar to FIG. 7 but showing a modification of the invention.
FIG. 13 is a view similar to FIG. 12 but showing a further modification of the teeth of the cotton pick-up belt, in accordance with the present invention.
Figures 12, 14, 15:
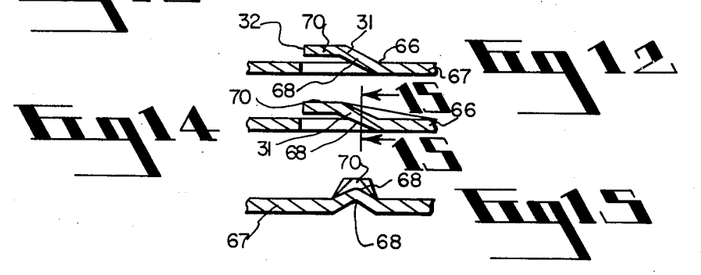
FIG. 12 is an enlarged sectional view taken from the line 12—12 of FIG. 11.
FIG. 14 is another view similar to FIG. 12 but showing a further modification of the teeth of the cotton pick-up belt, in accordance with the present invention.
FIG. 15 is a transverse fragmentary sectional view taken from the line 15—15 of FIG. 14.

As shown in FIG. 12 of the drawings, the tooth 31 is provided with an inclined portion 68 which is at an acute angle to the plane of the belt structure 67 and integral with this inclined portion 68 is a portion 70 which is substantially parallel with the plane of the belt strip 67 and and this portion 70 terminates with a pointed end structure, as shown in FIG. 11 of the drawings, In the modification shown in FIG. 13, the inclined portion 68 of the tooth 31 terminates in a flat machined portion 72 which may be ground parallel to the plane of the belt strip 67 and terminating at the point 32, thus providing a beveled section which is very sharp in both planes, namely that laterally of the belt strip 67 from edge to edge and from side to side. Thus, a very sharp point 32 is provided by the machine beveling of the portion 72, as shown in FIG. 13. It will be noted that the point 32 is thus maintained within a reasonable distance from the plane of the belt strip 67 so that excessive leverage thereon does not cause the tooth 31 to be highly stressed when it contacts the ground or bolls of cotton, as shown in FIG. 9 of the drawings, and as will be hereinafter described.

The parallel section 70 of the tooth 31, shown in FIG. 12 of the drawings, also maintains its point 32 at a reasonable distance from the plane of the belt strip 67 so that undue leverage is not applied to the tooth 31 and thus tendency toward overstressing at the root or buttress portion 66, of the respective tooth, is avoided.

As shown in FIGS. 14 and 15, the teeth 31 are similar in longitudinal sectional shape to the teeth shown in FIG. 12 of the drawings, and are provided with a portion 70 which is parallel to the plane of the belt strip 67. However, the inclined portion 68 of each tooth, as shown in FIG. 14, is slightly channeled in cross section, as shown in FIG. 15 of the drawings. This channel shaped cross section of the inclined portion 68 tends to stiffen the respective tooth at its base portion 66 and as its juncture and integral connection with the belt strip 67.

This channeled inclined structure 68, shown in FIG. 15 of the drawings, may be arcuate in cross section or V shaped in cross section, as desired. Thus, the structural thickness of the respective tooth, at its juncture or base portion 66, is increased, thereby preventing fatigue of the respective tooth at its integral connection with the belt strip 67.

In order to regulate the height at which the lower belt pulley 15 moves over the ground, I provide two runners 33 and 33' which are attached to the lower portion 34 of the lower part 20 of the belt tensioning member 18. These runners are each made adjustable by means of set screws 35, set in blocks 36 on the lower supporting part 34.

Figure 2:
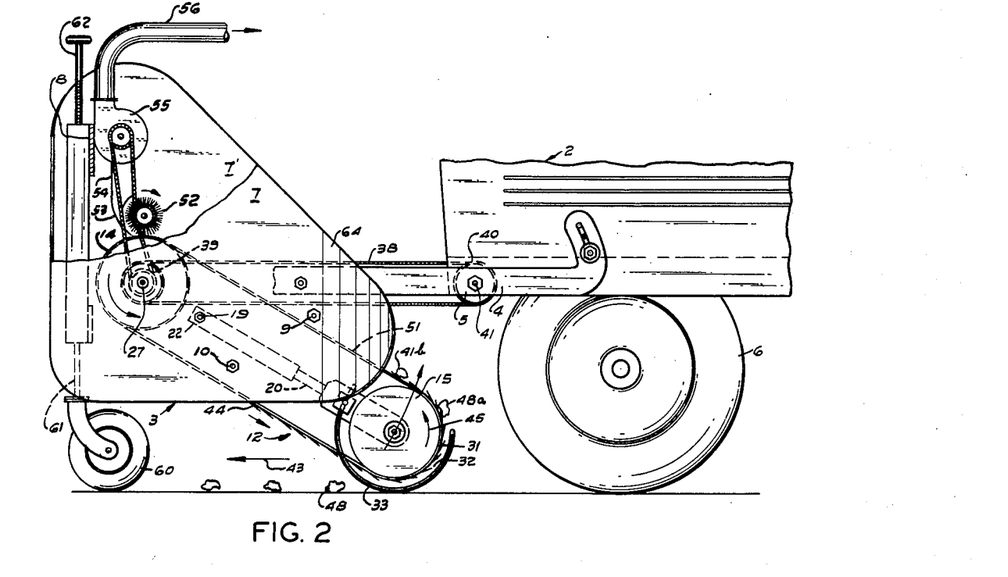
FIG. 2 is a side elevational view thereof.

As shown in FIG. 9 of the drawings, the belt 67 may run in contiguous relationship with the upper surface 74 of the ground and the members 33, shown in FIG. 2 of the drawings, may be eliminated, if desired. Thus, these runners 33 are not needed when the belt is run in contact with the upper surface 74 of the ground under many operating conditions.

The belt moves in a direction of an arrow A while the machine moves in a direction of the arrow B, tending to move in the same direction as though the belt A were ground driven. However, the belt A is driven at a rate slightly faster than it would ordinarily be ground driven if the machine were moved in the direction of the arrow B. Thus, the belt strip 67 with its teeth 31 operates in a direction to project the points 32 of the teeth in a direction opposite to the forward movement of the machine, as indicated by the arrow B. In order for the points 32 of the teeth 31 to be projected into cotton bolls, these teeth move in a rearward direction at a greater rate than the normal ground driven speed which would be imparted to the belt in the event the belt were ground driven.

As shown in FIGS. 9 and 10 of the drawings, the belt strip 67 passes around sheave members 76 which are mounted by means of a belt 78 extending through the centers thereof. These sheaves 76 are opposed sheaves having outboard flanges 80 opposed to each other and these flanges 80 tend to guide opposite edges of the belt strip 67.

The hub portions 82 of the sheaves 76 are mounted on an inner race of a bearing 84, the outer race of which is contained in the center of a bracket 86 connected to an arm 88 and supported in a manner similar to the arm 20, hereinbefore described.

The arm 88, at its lower end, is provided with a plurality of radiating fingers 90, one of said fingers 90 being split and having a clamp bolt 92 extending therethrough to clamp the bearing retaining structure around the outer race of the bearing 84 for holding it in position.

At the outer ends of the fingers 90 in an integral ring 93 which extends inwardly of the opposed flange portions of the sheave structures 76. This prevents cotton from passing between the belt strip 67 and the sheaves 76 and becoming wound around the axis structure of the sheaves adjacent to the bearing 84. Thus, the ring 93 held by the fingers 90 and the arm 88 prevents a common difficulty found in prior art machines which is created by long fibrous cotton winding around the axis structure of the sheaves and causing jamming thereof so that the machine must be disassembled before it may continue operating. This fault is alleviated by the present invention wherein the ring 93 acts as an inner shield inwardly of the flanges of the sheaves 76 so that cotton which may be engaged between the belt strip 67 and the sheaves 76 cannot become wound around the bearing supports for the sheaves. The large diameter of the ring 93 precludes the possibility of any of the fibers extending therearound and becoming linked into a rope or fabricated structure tending to bind the sheaves.

Coupled to the arm 88 is a U-shaped belt guide 94 which is disposed to guide opposite edges of the belt strip 67 as it approaches the sheaves 76 to maintain opposite edges of the belt strip 67 between the flanges 80, as shown in FIGS. 9 and 10 of the drawings.

Shaft 27, on which upper pulley 14 are keyed, extends tranversely within the body of the pick-up unit and is driven by a chain 38 which runs over a sprocket 39 on shaft 27 at the front and over a sprocket 40 at its rear. Sprocket 40 is driven by a shaft 41 on the tractive vehicle 2 which, in turn, is driven by a power take-off shaft 42 to which it is geared. The engine on the vehicle is considered a source of power for driving shaft 42 and 41 and sprocket 40.

Referring to FIG. 2, it will be noted that the device is moving from right to left, as indicated by arrow 43. At the same time the belts are moving downward on their lower runs 44. As they move downward they run over pulleys 15 which are turning in a counterclockwise direction as indicated by arrow 45. Thus, the bend of the belt and the lower run is going in the same direction as though the belt were being driven by contact with the ground over which it is travelling. However, this is not the case and the belt moves at a greater speed than it could derive from contact with the ground. This greater speed tends to cause the teeth 31 on the belt to engage, spear or stab tufts of cotton, such as 48, and engage them so that they will follow the belt around pulleys 15, as shown at 48a. This action is critical and it has been found by experiment that the device will not work successfully if the direction of the belt is reversed. It has been found that each pulley 15, carrying the belt, tends to crush the cotton tufts, such as 48, toward the ground while they are speared by an any one of the several teeth 31 which travel at a greater speed than the normal ground travel of the pulleys. This action tends to force the point of the teeth into the cotton tufts and hold the tuft until it is carried around the pulley as in the case of tuft marked 48a and held as in the case of tuft marked 48b until the belt reaches the upper run marked 51.

As shown in FIG. 9 of the drawings, the arm 88 supports the belt guide 94 by means of a bracket 96 which is provided with another arm structure 98 supporting a fender 100 which is disposed in spaced relation to an upper run 102 of the belt strip 67, as it passes upwardly in a direction of an arrow C, shown in FIG. 9 of the drawings. While an upper portion of the fender 100 is in spaced parallel relation to the upper run 102 of the belt strip 67, it provides sufficient clearance for the conveyance of cotton bolls 104 upwardly on the upper run 102 of the belt strip 67 and a lower portion of the fender 100 is arcuate at 106 in substantially concentric relationship with the sheaves 76 and a lower edge of this arcuate structure 106, designated 108, is resilient and operates close to the ground. In the event this structure 108 catches on a limb or dirt clod, it merely deflects resiliently and moves back into its position, as shown in FIG. 9 of the drawings. This lower end 108 of the fender 100 is in close proximity to the ground so that when the teeth 31 move toward the end 108 of the fender, any cotton bolls which tend to flip or move away centrifugally from the belt strip or teeth 31 will be caught by the fender 100 internally of the edge 108 thereof, consequently, the bolls will be engaged by the next successive tooth or teeth 31 thereby insuring the carriage of the cotton bolls upwardly and onto the upper run 102 of the belt strip 67. Thus, any cotton bolls which tend to flip off the belt, as it leaves the ground, may be caught by the fender 100 at its lower edge 108 to insure the further engagement of the teeth with the boll of cotton for the conveyance of the cotton upwardly between the belt and the fender onto the upper run 102 and from there to conventional means which will remove the cotton from the belt as it reaches an area of a sheave 14, as shown in FIG. 4 of the drawings. The cotton then rides on the upper run 51 until it reaches a position over the upper pulley 14 where it encounters the bristles of the rotary brush 52. Note that the brush revolves in a clockwise direction and thereby easily removes the tufts from the forwardly pointed teeth. That is, the teeth are pointed forwardly as the belt proceeds up the upper run 51.

As the brush 52 removes the cotton tufts they are sucked into the receiving shroud 53 and carried by suction into pipe 54 and into the suction of blower 55. The shroud 53 is provided with an open end curved around the doffer 52 and in closely spaced relation to the periphery thereof. From this blower they are exhausted through pipe 56 and into any convenient cotton receiving cage (not shown).

The distance between the ground and the lower bend of belts 25 as they run over pulleys 15 is regulated primarily by the runners 33 and 33', however, the height of the body 3 of the device and the upper pulleys and the shaft 27 on which they run is all regulated by caster wheel 60. This caster wheel is in turn supported on a pivot shaft 61 which may be regulated as to height by screw shaft 62.

As hereinbefore described, the belt strip 67 may operate in contiguous relationship with the ground under many conditions of operation and the teeth 31 at their points 32 will actually shear the surface of the soil and by this means may very efficiently spear or stock into bolls of cotton lying on the surface of the ground.

Since the belt strip 67 operates in the same direction as though it were ground driven, it will effectively engage and compress bolls of cotton on the upper surface of the ground whereupon the movement of the teeth relative to the ground, at a speed slightly greater than that which might be imparted by a ground driven operation, will cause the cotton bolls compressed under the belt to be speared by the teeth 31 at their points 32, as the cotton is held down under the belt on the upper surface of the ground.

The fact that the belt moves at greater than ground speed, it has a slight shearing action at the points 32 of the teeth 31 and this shearing action causes the teeth to move relative to the surface of the ground and actually spear the cotton bolls which are then compressed between the belt and the ground. Thus, efficient engagement and spearing of the cotton bolls by means of the points 32 of the teeth 31 is attained so that the cotton bolls are carried on the belt upwardly and inwardly of the fender 100 and onto the upper lay or portion 67 of the belt, all as shown best in FIG. 9 of the drawings.

On each side of the body 3 of this device there are shield plates 64 which tend to brush aside cotton stalks 65 that may be encountered in the field.

In use, the device, after being attached to the front end of the tractive vehicle 2 is then attached to the power takeoff shaft 42 and all belts set in motion. The device is then pushed through the field between the cotton stalks 65, as shown in FIG. 3. The several belts and their lower ends operate just above the ground. Each belt is free to be supported just above the ground on its own runners and hence the device follows the contour of the ground. As the cotton tufts are stabbed or snagged by the belt teeth they are carried through pipe 56 to a convenient receiving cage. The cotton so secured is found to be of good grade and comparatively free from dirt, sticks and pieces of leaves commonly known as trash.

In the modification of the invention as shown in FIGS. 16 to 20, inclusive, a vehicle frame 110 is supported by ground engaging wheels 112 having peripheries 114 adapted to run on the surface 116 of the ground on which cotton bolls 118 are disposed. These cotton bolls 118 are mature cotton which have either fallen to the ground or which may have been knocked to the ground by operation of a cotton harvester.

While the frame 110, as shown in FIG. 16, is adapted to support the cotton harvester of the invention in a cantilever fashion forwardly of the wheels 112, such a frame 110 may be disposed to support the cotton harvester of the invention in a following disposition as well. Coupled to the frame 110 is a generally box-like frame structure 120 having opposite sides 122 and 124 coupled together by ends 126 and 128. This box-like frame is open at its upper portion 130 and open at its lower portion 132. The sides and ends of the frame may be made of sheet steel or any other suitable material.

At the forward end of the box-shaped frame structure 120 are limb pick up devices 134 which are substantially conventional and form no part of the present invention.

Figure 18:
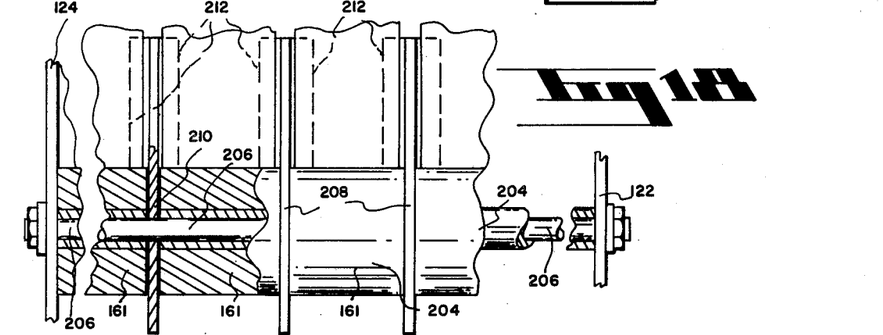
FIG. 18 is an enlarged fragmentary sectional view taken from the line 18—18 of FIG. 16.
Figure 19:
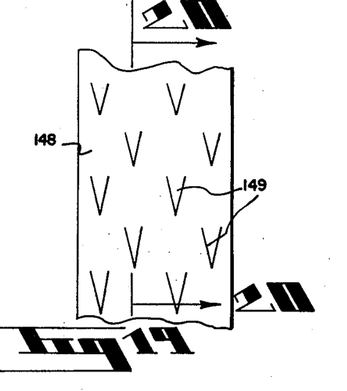
FIG. 19 is an enlarged fragmentary elevational view of one of the flexible metal cotton pick-up belts of the invention.
Figure 20:
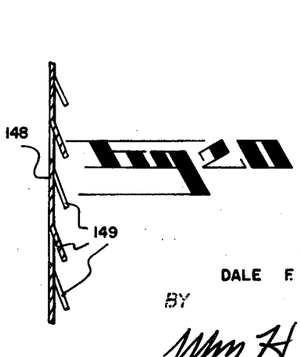
FIG. 20 is a fragmentary sectional view taken from the line 20—20 of FIG. 19.

Rotatably mounted between the side plates 122 and 124 is a generally drum shaped magnetic drive assembly 136 mounted on an axle 138 which is channeled in bearings carried by the side plates 122 and 124, as shown best in FIGS. 16 and 18 of the drawings. The shaft 138 and the magnetic assembly 136 is power driven by any suitable means such as chains and sprockets, gears and shafts, or other suitable means for driving the shaft 138 to rotate the drum assembly 136 in a direction of an arrow 140, as shown in FIG. 16. The drum assembly 136 is provided with a hub 142 having radially disposed arms 144 connected thereto. These arms at their outer extremities carry permanent magnets 146 which engage metal belts 148 and drive them, as will be hereinafter described in detail. The permanent magnets 146 are arranged in a generally annular row concentric with the axis of the shaft 138, and are arranged to drive the metal belts 148 at a linear speed slightly greater than the vehicle movement in the direction of an arrow 150, as hereinbefore described. The metal belts 148 are preferably made of steel or other magnetically responsive material, or may be of any flexible means having magnetic responsive material therein, so that the belts may be substantially slack at 152 adjacent the ground 116. The belts 148 are endless belts and pass over a roller 154 and assemblies of rollers 156 and 160, as will be hereinafter described in detail. The roller 154, and assemblies of rollers 156 and 160 are disposed such that the belts 148 will be in slack condition so that they are not stressed to a yield point to cause fatigue, and so that the belts are slack at 152 so that they will rest intimately on the ground as they are driven thereover at a speed slightly greater than ground speed of the vehicle and in a rearward direction, as indicated by an arrow 162 in FIG. 16 of the drawings.

Figure 17:
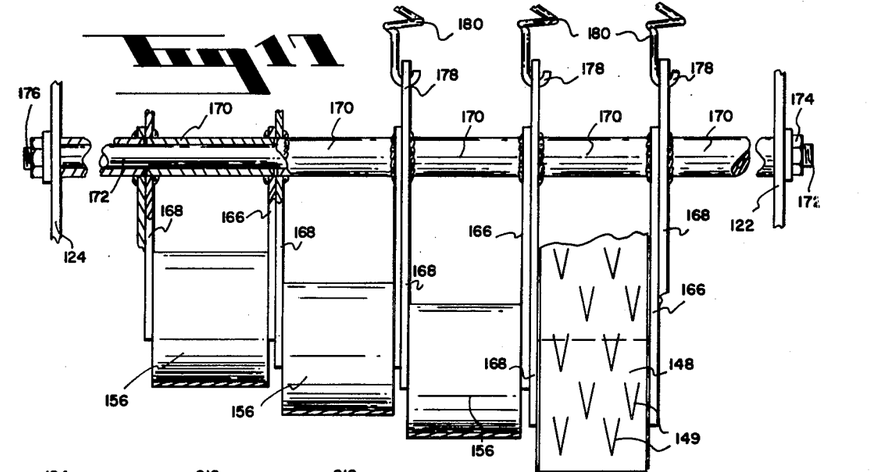
FIG. 17 is an enlarged fragmentary sectional view taken from the line 17—17 of FIG. 16.

As shown in FIGS. 16 and 17, the rollers 156 are mounted so that each of the rollers 156 engages one of the belts 148 near the ground 116. Each roller 156 is mounted on a respective shaft 164 carried between a respective pair of arms 166 and 168 which are welded to respective hollow shaft sections 170 internally of which a shaft 172 is disposed. Opposite ends of the shaft 172 extend through the side plates 122 and 124 and are held adjacent said plates by screw threaded nuts 174 and 176 screw threaded on opposite ends of the shaft 172. Individual hollow shaft sections 170 are pivotally mounted on the shaft 172 and independently carry the rollers 156 in connection with the respective pairs of lever or bracket members 166 and 168. The levers or roller support members 166 are welded to each respective hollow shaft 170 and terminate adjacent thereto, while the levers 168 extend beyond the respective hollow shafts 170 and are each connected at 178 to one end 79 of a spring 180. Opposite ends 81 of the springs 180 being connected at 182 to an end 184 of a respective bar 186, a plurality of these bars 186 being required to carry the respective springs 180, and these bars 186 are commonly connected together by means of a shaft 188 extending transversely and having opposite ends fixed to the side plates 122 and 124.

Each of the bars 186 is also secured to a shaft 194 having opposite ends which are fixed to the side plates 122 and 124 so that the levers 192 are pivotally mounted on the bars 186 by means of a shaft 193 to pivotally actuate the roller 154, as will be hereinafter described.

An upper end of the one lever 192 is connected to a pin 196 which is pivotally connected to a plunger 198 of an actuator 200, which may be a hydraulic cylinder or other type actuator, for retracting the levers into a broken line position 202 to thereby move the rollers 154 into the broken line positions as shown in FIG. 16, as will be hereinafter described.

It will be noted that the roller 154 extends across all of the belts 148 and that the roller 154 is pivotally mounted on a pair of levers 192 and that these levers 192 are rigidly interconnected by a bar 195.

The roller 154 is mounted on a shaft 202 connected to normally lower ends of the levers 192. Thus, when the actuator 200 retracts its plunger 198, the levers 192 are pivoted, the roller 154 is moved laterally, causing tension in the belts 148 to raise the rollers 156 against tension of the springs 180 and to dispose the lower extremities of the belts 148 in a broken line position A well above the ground level 116 so that the belts may be moved upwardly away from the ground in order to maneuver the machine over rough ground at the ends of cotton plant rows.

The roller assembly 160 includes a plurality of individual rollers 161 mounted on respective bushings 204 carried by a cross shaft 206 supported at its opposite ends in the side plates 122 and 124, all as shown best in FIG. 18 of the drawings. Disposed between the bushings 204 are guides 208 which may act as separators for the individual belts 148 on the respective rollers 161.

Each guide 208 has an opening 210 through which the shaft 206 extends, thus the guides 208 are supported on the shaft 206.

Each guide 208 is provided with a flange portion 212 which is disposed to be substantially parallel with the respective belts 148 in a tangential approach to the arcuate path of the perimeter of the rotary magnetic drive assembly 136. Thus opposite edges of each belt 148 may be guided and retained in substantial alignment with the periphery of the respective roller 161 and the periphery of the magnetic drive assembly 136.

Disposed near the upper open end of the box shaped frame assembly 120 is a doffer housing 214 having a rotary doffer 216 rotatably driven therein on a shaft 218. This doffer is provided with brush like extremities 220 adapted to brush cotton from the tooth 149 of the belts 148. The doffer rotates in a direction of an arrow 222 which corresponds with the direction of the teeth such that the doffers move relative to the belt in a direction from the root of each tooth to the pointed or tip end thereof.

As the doffer 216 rotates in the housing 214 it carries cotton and removes the cotton from the teeth 149 so that vacuum in a conduit 224 communicating with the doffer housing 214 carries the cotton from the doffer and to a collector basket or the like.

The teeth 149 of the metal belt 148 may be constructed as hereinbefore described, and these teeth may be similar to the previously described teeth 31 disclosed in FIGS. 9 to 15, inclusive, of the drawings.

It will be obvious to those skilled in the art that various modifications of the present invention may be resorted to in a manner limited only by a just interpretation of the following claims.

I claim:

1. A cotton gleaner for removing knocked down cotton from the ground of a cotton field comprising: a body frame having longitudinal side members with rearward extending portions adapted for attachment to the front end of a tractive vehicle having an engine and a power takeoff shaft; a transversely extending gang of parallel endless flat metal gleaner belts each having teeth on their outer surface with sharp points directed in the direction of belt travel, an upper and a lower belt pulley within each endless belt supporting it so that it has downwardly and rearwardly declining parallel upper and lower spaced portions, a stretcher element tending to resiliently force each pair of pulleys apart and to tension the belt which they support, and pivotally support the lower pulley, ground engaging runners on the lower portion of each stretcher element and disposed to support the lower pulley above the ground, a transverse driving shaft on said frame keyed to each of the upper pulleys, a rotary brush rotating in contact with the outer surface of said belts adjacent said upper pulleys to remove cotton from the teeth on said belts, a suction pipe having an open end disposed adjacent said brush to catch and remove cotton from said brush and belts, a blower on said frame having a suction inlet connected to said suction pipe and a discharge pipe connected to said blower adapted to convey cotton to a place of deposit.

2. A cotton gleaner for removing knocked down cotton from the ground of a cotton field comprising a body frame having longitudinal side members with rearward extending portions adapted for attachment to the front end of a tractive vehicle having an engine and a power takeoff shaft; a mechanism for picking cotton tufts from the ground comprising; a plurality of pairs of pulleys; spreader means interconnecting said pulleys; a plurality of flat metal endless belts each running over a pair of said pulleys, a power operated driving shaft, one pulley of each pair being elevated above and positioned forward of the other and journalled on said driving shaft, ground engaging runners connected to said spreader means and disposed to slidably support said lower pulley above the ground, said belt having snagging teeth on their outer faces, power driven means disposed to rotate said driving shaft to drive said pulleys and belts, and means for removing cotton from said belts including a rotary brush disposed adjacent said teeth and rotatable so that its bristles move in a direction to dislodge cotton snagged by the teeth on said belts, and suction means disposed near said brush for removing cotton dislodged from said belts by said brush.

3. In a cotton harvester the combination of: a rotating structure disposed to be operated above the ground; a belt on said rotating structure and having upper and lower portions above and below said rotating structure inclined relative to the surface of the ground; teeth on said belt structure having pointed ends directed rearwardly with respect to the forward movement of the harvester; and means for driving said belts at a speed substantially greater than that corresponding to ground driven speed whereby the belt is progressively rolled onto the surface of the earth and slightly moved relative thereto so that said teeth shear the surface of the earth and point backwardly relative to the forward directional movement of the machine and, thus, compress cotton bolls beneath said belt and spear them while the belt is moving relative to the ground at a speed greater than the normal rolling speed which would be imparted to the belt were it ground driven; said belt being a thin sheet metal belt; said teeth being punched out of said belt and being substantially triangular in cross section having pointed ends and base structures integral with said belt.

4. In a cotton harvester the combination of: a rotating structure disposed to be operated above the ground; a belt on said rotating structure and having upper and lower portions above and below said rotating structure inclined relative to the surface of the ground; teeth on said belt structure having pointed ends directed rearwardly with respect to the forward movement of the harvester; and means for driving said belts at a speed substantially greater than that corresponding to ground driven speed whereby the belt is progressively rolled onto the surface of the earth and slightly moved relative thereto so that said teeth shear the surface of the earth and point backwardly relative to the forward directional movement of the machine and, thus, compress cotton bolls beneath said belt and spear them while the belt is moving relative to the ground at a speed greater than the normal rolling speed which would be imparted to the belt were it ground driven; said belt being a thin sheet metal belt; said teeth being punched out of said belt and being substantially triangular in cross section having pointed ends and base structures integral with said belt; said teeth being disposed at a substantially acute angle relative to the normal plane of said belt.

5. In a cotton harvester the combination of: a rotating structure disposed to be operated above the ground; a belt on said rotating structure and having upper and lower portions above and below said rotating structure inclined relative to the surface of the ground; teeth on said belt structure having pointed ends directed rearwardly with respect to the forward movement of the harvester; and means for driving said belts at a speed substantially greater than that corresponding to ground driven speed whereby the belt is progressively rolled onto the surface of the earth and slightly moved relative thereto so that said teeth shear the surface of the earth and point backwardly relative to the forward directional movement of the machine and, thus, compress cotton bolls beneath said belt and spear them while the belt is moving relative to the ground at a greater speed than the normal rolling speed which would be imparted to the belt were it ground driven; said belt being a thin sheet metal belt; said teeth being punched out of said belt and being substantially triangular in cross section having pointed ends and base structures integral with said belt; said teeth being disposed at a substantially acute angle relative to the normal plane of said belt; portions of said teeth adjacent their pointed ends being substantially parallel with the normal plane of said belt.

6. In a cotton harvester the combination of: a rotating structure disposed to be operated above the ground; a belt on said rotating structure and having upper and lower portions above and below said rotating structure inclined relative to the surface of the ground; teeth on said belt structure having pointed ends directed rearwardly with respect to the forward movement of the harvester; and means for driving said belts at a speed substantially greater than that corresponding to ground driven speed whereby the belt is progressively rolled onto the surface of the earth and slightly moved relative thereto so that said teeth shear the surface of the earth and point backwardly relative to the forward directional movement of the machine and, thus, compress cotton bolls beneath said belt and spear them while the belt is moving relative to the ground at a greater speed than the normal rolling speed which would be imparted to the belt were it ground driven; said belt being a thin sheet metal belt; said teeth being punched out of said belt and being substantially triangular in cross section having pointed ends and base structures integral with said belt; said teeth being disposed at a substantially acute angle relative to the normal plane of said belt; portions of said teeth adjacent their pointed ends being substantially parallel with the normal plane of said belt; the cross-sectional shape of said teeth between their base structures and their pointed ends being slightly channeled.

7. In a cotton harvester the combination of: a cotton harvester vehicle structure having a forward end; a rotating structure on said vehicle structure disposed to be operated above the ground; cotton impaling elements on said rotating structure and directed rearward with respect to said forward end of said vehicle structure and rearward with respect to the forward movement of said cotton harvester vehicle structure; and means for driving said rotating structure at a speed substantially greater than that corresponding to ground driven speed whereby said rotating structure is progressively disposed relative to the surface of the earth and slightly moved relative thereto so that said impaling elements accomplish shearing action relative to the surface of the earth and move rearwardly relative to the forward directional movement of the cotton harvester and, thus, the cotton bolls disposed beneath said rotating structure are impaled and gathered by said impaling elements while moving relative to the ground at a speed slightly greater than the normal rolling speed which would be imparted to the rotating structure were it ground driven.

8. In a cotton harvester the combination of: a rotating structure disposed to be operated above the ground; cotton impaling elements on said rotating structure and directed rearward with respect to the forward movement of said cotton harvester; and means for driving said rotating structure at a speed substantially greater than that corresponding to ground driven speed whereby said rotating structure is progressively disposed relative to the surface of the earth and slightly moved relative thereto so that said impaling elements accomplish shearing action relative to the surface of the earth and move rearwardly relative to the forward directional movement of the cotton harvester and, thus, the cotton bolls disposed beneath said rotating structure are impaled and gathered by said impaling elements while moving relative to the ground at a speed slightly greater than the normal rolling speed which would be imparted to the rotating structure were it ground driven.

9. In a cotton harvester the combination of: a rotating structure disposed to be operated above the ground; cotton impaling elements on said rotating structure and directed rearward with respect to the forward movement of said cotton harvester; and means for driving said rotating structure at a speed substantially greater than that corresponding to ground driven speed whereby said rotating structure is progressively disposed relative to the surface of the earth and slightly moved relative thereto so that said impaling elements accomplish shearing action relative to the surface of the earth and move rearwardly relative to the forward directional movement of the cotton harvester and, thus, the cotton bolls disposed beneath said rotating structure are impaled and gathered by said impaling elements while moving relative to the ground at a speed slightly greater than the normal rolling speed which would be imparted to the rotating structure were it ground driven; said rotating structure comprising a substantially drum shaped rotating magnetic assembly and metal belts engaged by said magnetic assembly and means disposed to guide said belts in flat condition adjacent to the ground whereby said impaling elements may substantially engage the surface of the earth.

10. In a cotton harvester the combination of: a rotating structure disposed to be operated above the ground; cotton impaling elements on said rotating structure and directed rearward with respect to the forward movement of said cotton harvester; and means for driving said rotating structure at a speed substantially greater than that corresponding to ground driven speed whereby said rotating structure is progressively disposed relative to the surface of the earth and slightly moved relative thereto so that said impaling elements accomplish shearing action relative to the surface of the earth and move rearwardly relative to the forward directional movement of the cotton harvester and, thus, the cotton bolls disposed beneath said rotating structure are impaled and gathered by said impaling elements while moving relative to the ground at a speed slightly greater than the normal rolling speed which would be imparted to the rotating structure were it ground driven; a shield adjacent said rotating structure and disposed slightly above the ground and spaced rearwardly from said rotating structure to permit the carrying of cotton bolls adjacent to said shield structure as said cotton impaling elements move upwardly from the ground.

11. In a cotton harvester the combination of: a rotating structure disposed to be operated above the ground; cotton impaling elements on said rotating structure and directed rearward with respect to the forward movement of said cotton harvester; and means for driving said rotating structure at a speed substantially greater than that corresponding to ground driven speed whereby said rotating structure is progressively disposed relative to the surface of the earth and slightly moved relative thereto so that said impaling elements accomplish shearing action relative to the surface of the earth and move rearwardly relative to the forward directional movement of the cotton harvester and, thus, the cotton bolls disposed beneath said rotating structure are impaled and gathered by said impaling elements while moving relative to the ground at a speed slightly greater than the normal rolling speed which would be imparted to the rotating structure were it ground driven; said rotating structure comprising a generally drum shaped magnetic assembly comprising a plurality of magnets disposed in a substantially annular row; and a plurality of magnetically responsive endless belts disposed over said drum assembly and driven thereby; and means guiding said belts in substantially slack condition into adjacent relation with the surface of the earth.

12. In a cotton harvester the combination of: a rotating structure disposed to be operated above the ground; cotton impaling elements on said rotating structure and directed rearward with respect to the forward movement of said cotton harvester; and means for driving said rotating structure at a speed substantially greater than that corresponding to ground driven speed whereby said rotating structure is progressively disposed relative to the surface of the earth and slightly moved relative thereto so that said impaling elements accomplish shearing action relative to the surface of the earth and move rearwardly relative to the forward directional movement of the cotton harvester and, thus, the cotton bolls disposed beneath said rotating structure are impaled and gathered by said impaling elements while moving relative to the ground at a speed slightly greater than the normal rolling speed which would be imparted to the rotating structure were it ground driven; said rotating structure comprising a generally drum shaped magnetic assembly comprising a plurality of magnets disposed in a substantially annular row; and a plurality of magnetically responsive endless belts disposed over said drum assembly and driven thereby; and means guiding said belts in substantially slack condition into adjacent relation with the surface of the earth; said last mentioned means comprising a plurality of rollers and guides for said belts; and means for retracting said rollers to raise said belts above the surface of the earth when not in operation and for the purpose of transporting said belts above ground level.

13. In a cotton harvester the combination of: a cotton harvester vehicle structure having a forward end; a rotating structure on said vehicle structure disposed to be operated above the ground; an endless belt engaged on said rotating structure, said belt having upper and lower portions above and below said rotating structure and inclined relative to the surface of the ground; cotton impaling elements on said belt structure and directed rearward with respect to said forward end of said vehicle structure and rearward with respect to the forward movement of said cotton harvester vehicle structure; and means for driving said belt at a speed substantially greater than that corresponding to ground driven speed whereby said belt is progressively disposed onto the surface of the earth and slightly moved relative thereto so that said impaling elements accomplish shearing action relative to the surface of the earth and pull it rearwardly relative to the forward directional movement of the cotton harvester and, thus, the belt compress cotton bolls beneath said belt and said impaling elements impale and gather said cotton bolls while held by the belt and while the belt is moving relative to the ground at a speed slightly greater than the normal rolling speed which would be imparted to the belt were they ground driven.

References Cited by the Examiner

UNITED STATES PATENTS

| | | | |
|---|---|---|---|
| 401,822 | 4/89 | Detweiler | 56—350 |
| 2,670,584 | 3/54 | Rood et al. | 56—28 |
| 2,729,046 | 1/56 | Patterson | 56—328 |
| 2,928,224 | 3/60 | Powell | 56—28 |
| 3,039,257 | 6/62 | Brewster | 56—28 |

ABRAHAM G. STONE, *Primary Examiner.*

RUSSELL R. KINSEY, *Examiner.*